(12) United States Patent
Wu

(10) Patent No.: US 12,013,816 B2
(45) Date of Patent: Jun. 18, 2024

(54) QUERYING METADATA IN A STORAGE SYSTEM

(71) Applicant: Seagate Technology LLC, Fremont, CA (US)

(72) Inventor: Sining Wu, Chichester (GB)

(73) Assignee: Seagate Technology LLC, Fremont, CA (US)

( * ) Notice: Subject to any disclaimer, the term of this patent is extended or adjusted under 35 U.S.C. 154(b) by 164 days.

(21) Appl. No.: 17/587,281

(22) Filed: Jan. 28, 2022

(65) Prior Publication Data

US 2023/0244637 A1 Aug. 3, 2023

(51) Int. Cl.
*G06F 16/14* (2019.01)
*G06F 16/13* (2019.01)
*G06F 16/16* (2019.01)

(52) U.S. Cl.
CPC .......... *G06F 16/156* (2019.01); *G06F 16/137* (2019.01); *G06F 16/164* (2019.01)

(58) Field of Classification Search
CPC ..... G06F 16/156; G06F 16/164; G06F 16/137
See application file for complete search history.

(56) References Cited

U.S. PATENT DOCUMENTS

| 7,415,608 B2 * | 8/2008 | Bolosky | H04L 9/3249 713/165 |
| 9,219,945 B1 * | 12/2015 | Velummylum | G11B 27/036 |
| 9,268,796 B2 | 2/2016 | Pope et al. | |
| 9,507,833 B2 | 11/2016 | Guirguis et al. | |
| 10,176,212 B1 | 1/2019 | Prohofsky | |
| 10,248,476 B2 | 4/2019 | Cairns | |
| 10,523,756 B1 | 12/2019 | Chakraborty et al. | |
| 10,553,038 B2 | 2/2020 | De La Mora Molina et al. | |
| 10,726,009 B2 | 7/2020 | Pal et al. | |

(Continued)

FOREIGN PATENT DOCUMENTS

| JP | 2007104716 A | * | 4/2007 | ......... G06F 16/7837 |
| JP | 2020048182 A | * | 3/2020 | .......... G07C 5/0825 |
| WO | 2021262155 A1 | | 12/2021 | |

OTHER PUBLICATIONS

B. Beyer, C. Jones, J. Petoff and N. R. Murphy, "Site Reliability Engineering: How Google Runs Production Systems," Chapter 6—Monitoring Distributed Storage Systems, https://sre.google/srebook/monitoring-distributed-systems/, 2016, 17 pages.

(Continued)

*Primary Examiner* — Hosain T Alam
*Assistant Examiner* — Anthony G Gemignani
(74) *Attorney, Agent, or Firm* — Westman, Champlin & Koehler, P.A.

(57) ABSTRACT

A metadata query is received in as storage system from a client node that asks one or more questions regarding a set of metadata in a metadata store. The metadata query is executed on at least one metadata summary structure. Each metadata summary structure summarizes a metadata stream of metadata access during a period of time, and different metadata summary structures from different periods of time are periodically merged together so that the metadata query is conducted on a merged metadata summary structure. An answer is returned from the query executed on the merged metadata summary structure.

20 Claims, 4 Drawing Sheets

(56) References Cited

U.S. PATENT DOCUMENTS

| | | | |
|---|---|---|---|
| 2015/0149611 A1* | 5/2015 | Lissack | H04L 41/12 709/224 |
| 2018/0046383 A1 | 2/2018 | Gates | |
| 2018/0136838 A1 | 5/2018 | White et al. | |
| 2019/0385453 A1 | 12/2019 | Dorne et al. | |
| 2020/0025768 A1 | 1/2020 | Kagamu | |
| 2020/0133543 A1 | 4/2020 | Singh | |
| 2021/0256060 A1* | 8/2021 | Janakiraman | G06F 16/7867 |
| 2023/0144763 A1 | 5/2023 | Peng et al. | |

OTHER PUBLICATIONS

P. Carns, R. Latham, R. Ross, K. Iskra, S. Lang and K. Riley, "24/7 Characterization of petascale I/O workloads," 2009 IEEE International Conference on Cluster Computing and Workshops, Aug.-Sep. 2009, New Orleans, LA, USA, pp. 1-10, 10 pages.

G. Cormode and S. Muthukrishnan, "An improved data stream summary: The Count-Min sketch and its applications," Journal of Algorithms, vol. 55, Issue 1, Apr. 2005, pp. 58-75, 18 pages.

Graham Cormode and S. Muthukrishnan. 2005. What's hot and what's not: tracking most frequent items dynamically. chrome-extension://efaidnbmnnnibpcajpcglclefindmkaj/viewer.html?pdfurl=http%3A%2F%2Fdimacs.rutgers.edu%2F~graham%2F%2Fpubs%2Fpapers%2Fwhatshot-tods.pdf&clen=334057&chunk=true, ACM Trans. on Database Syst. vol. 30, No. 1, Mar. 2005, pp. 249-278, 29 pages.

DataSketches, "The Business Challenge: Analyzing Big Data Quickly," https://datasketches.apache.org/, at least as early as Jan. 18, 2022, 3 pages.

John R. Douceur and William J. Bolosky. A Large-Scale Study of File-System Contents.chrome-extension://efaidnbmnn-nibpcajpcglclefindmkaj/viewer.html?pdfurl=https%3A%2F%2Fwww.microsoft.com%2Fen-us%2Fresearch%2Fwp-content%2Fuploads%2F1999%2F01%2FSigmetrics1999.pdf&clen=244486, Sigmetrics '99, Atlanta, GA, USA, May 1999, 12 pages.

Anna C. Gilbert, Yannis Kotidis, S. Muthukrishnan, and Martin J. Strauss. 2002. How to summarize the universe: dynamic maintenance of quantiles. In Proceedings of the 28th international conference on Very Large Data Bases (VLDB '02), Hong Kong, China, Aug. 2002, 454-465, 12 pages.

GitHub, "Cortx-motr," https://github.com/Seagate/cortx-motr, at least as early as Jan. 18, 2022, 3 pages.

GitHub, "Maestro IO Interface: a higher-level API to the CORX internal motr interface," https://github.com/Seagate/cortx-mio, at least as early as Jan. 18, 2022, 4 pages.

Jen-Wei Hsieh, Tei-Wei Kuo, and Li-Pin Chang. 2006. Efficient identification of hot data for flash memory storage systems. chrome-extension://efaidnbmnnnibpcajpcglclefindmkaj/viewer.html?pdfurl=https%3A%2F%2Fpeople.engr.tamu.edu%2Fajiang%2FHotData.pdf&clen=557227, ACM Trans. on Storage col. 2, Issue 1, Feb. 2006, pp. 22-40, 19 pages.

Z. Karnin, K. Lang and E. Liberty, "Optimal Quantile Approximation in Streams," 2016 IEEE 57th Annual Symposium on Foundations of Computer Science (FOCS), Apr. 2016, New Brunswick, NJ, USA, pp. 71-78, 12 pages.

Andrew W. Leung, Shankar Pasupathy, Garth Goodson, and Ethan L. Miller. Measurement and analysis of large-scale network file system workloads. chrome-extension://efaidnbmnn-nibpcajpcglclefindmkaj/viewer.html?pdfurl=https%3A%2F%2Fwww.usenix.org%2Flegacy%2Fevent%2Fusenix08%2Ftech%2Ffull_papers%2Fleung%2Fleung.pdf&clen=539351&chunk=true, In USENIX 2008 Annual Technical Conference (ATC '08). USENIX Association, USA, Jun. 2008, Boston, MA, USA, pp. 213-226, 14 pages.

Glenn K. Lockwood, Shane Snyder, Teng Wang, Suren Byna, Philip Carns, and Nicholas J. Wright. 2018. A year in the life of a parallel file system. chrome-extension://efaidnbmnnnibpcajpcglclefindmkaj/viewer.html?pdfurl=https%3A%2F%2Fsdm.lbl.gov%2F~sbyna%2Fresearch%2Fpapers%2F201811-SC18-YearLifePFS.pdf&clen=473535&chunk=true, In Proceedings of the International Conference for High Performance Computing, Networking, Storage, and Analysis (SC '18), Nov. 2018, Dallas, TX, USA, 14 pages.

Charles Masson, Jee E. Rim, and Homin K. Lee. 2019. DDSketch: a fast and fully mergeable quantile sketch with relative-error guarantees. chrome-extension://efaidnbmnnnibpcajpcglclefindmkaj/viewer.html?pdfurl=https%3A%2F%2Fwww.vldb.org%2Fpvldb%2Fvol12%2Fp2195-masson.pdf&clen=622583&chunk=true, Proceedings of the VLDB Endow. 12, No. 12, Aug. 2019, 11 pages.

D. Park and D. H. C. Du, "Hot data identification for flash-based storage systems using multiple bloom filters," 2011 IEEE 27th Symposium on Mass Storage Systems and Technologies (MSST), May 2011, Denver, CO, USA, 11 pages.

Sage Storage, "A Unified Data Storage System Platform for AI, Deep Learning, Big Data Analysis and High Performance Computing," https://sagestorage.eu/, at least as early as Jan. 18, 2022, 4 pages.

B. Welch and G. Noer, "Optimizing a hybrid SSD/HDD HPC storage system based on file size distributions," 2013 IEEE 29th Symposium on Mass Storage Systems and Technologies (MSST), May 2013, Lake Arrowhead, CA, USA, 12 pages.

Wikipedia, "Count-min sketch," https://en.wikipedia.org/wiki/Count%E2%80%93min_sketch, at least early as Jan. 18, 2022, 4 pages.

Wikipedia, "Metadata," https://en.wikipedia.org/wiki/Metadata, at least as early as Jan. 18, 2022, 26 pages.

Wikipedia, "Object Storage," https://en.wikipedia.org/wiki/Object_storage, at least as early as Jan. 18, 2022, 10 pages.

Non-Final Rejection for U.S. Appl. No. 17/587,271, mailed Nov. 6, 2023, 33 pages.

\* cited by examiner

QUERYING METADATA IN A STORAGE SYSTEM

SUMMARY

A method of querying metadata in a storage system is provided. The method includes receiving a metadata query from a client node that asks one or more questions regarding a set of metadata in a metadata store. The metadata query is executed on at least one metadata summary structure. The at least one metadata summary structure summarizes a metadata stream of metadata access during a period of time, and different metadata summary structures from different periods of time are periodically merged together so that the metadata query is conducted on a merged metadata summary structure. An answer is returned from the query executed on the merged metadata summary structure.

Another method of querying metadata in a storage system is provided. Each of a plurality of metadata servers receives in parallel a query from a client node that asks one or more questions regarding sets of metadata in corresponding metadata stores. Each of the plurality of metadata servers executes in parallel the metadata query on at least one metadata summary structure. The at least one metadata summary structure summarizes a metadata stream of metadata access by one of the plurality of metadata servers during a period of time, and different metadata summary structures from different periods of time are periodically merged together so that the metadata query is conducted on a merged metadata summary structure. A plurality of answers are returned from the plurality of metadata servers that each executed the query on the merged metadata summary structure.

A storage system includes at least one client node, at least one metadata store and at least one metadata server corresponding with the at least one metadata store and configured to receive metadata operations and metadata queries from the at least one client node. At least one metadata summary structure is configured to summarize a metadata stream of metadata access during a period of time. Different metadata summary structures from different periods of time are periodically merged together so that a metadata query is executed on a merged metadata summary structure. The at least one client node is configured to receive an answer from the metadata query executed on the merged metadata summary structure.

This summary is not intended to describe each disclosed embodiment or every implementation of querying metadata in a storage system as described herein. Many other novel advantages, features, and relationships will become apparent as this description proceeds. The figures and the description that follow more particularly exemplify illustrative embodiments.

DETAILED DESCRIPTION

In general, storage systems contain rich metadata that play a critical role in computing systems including, but not limited to, distributed storage systems, such as distributed file systems or object-based distributed data storage systems. Metadata is data that provides information about other data. In other words, metadata is data about data.

For example, a file system maintains a tree-like hierarchy namespace in directories and associates a file with a rich set of attributes, such as the file size, creation time, the time it was last accessed, the time the file's metadata was changed or the time the file was last backed up. Unlike pre-defined metadata in file systems, object-based systems provide for full function, custom, object-level metadata. For example, object-based storage systems are able to manage application-specific metadata that helps describe an object. Conversely, the metadata in object-based systems help applications understand and analyze an object to gain better input/output (IO) access performance.

Figure 1:
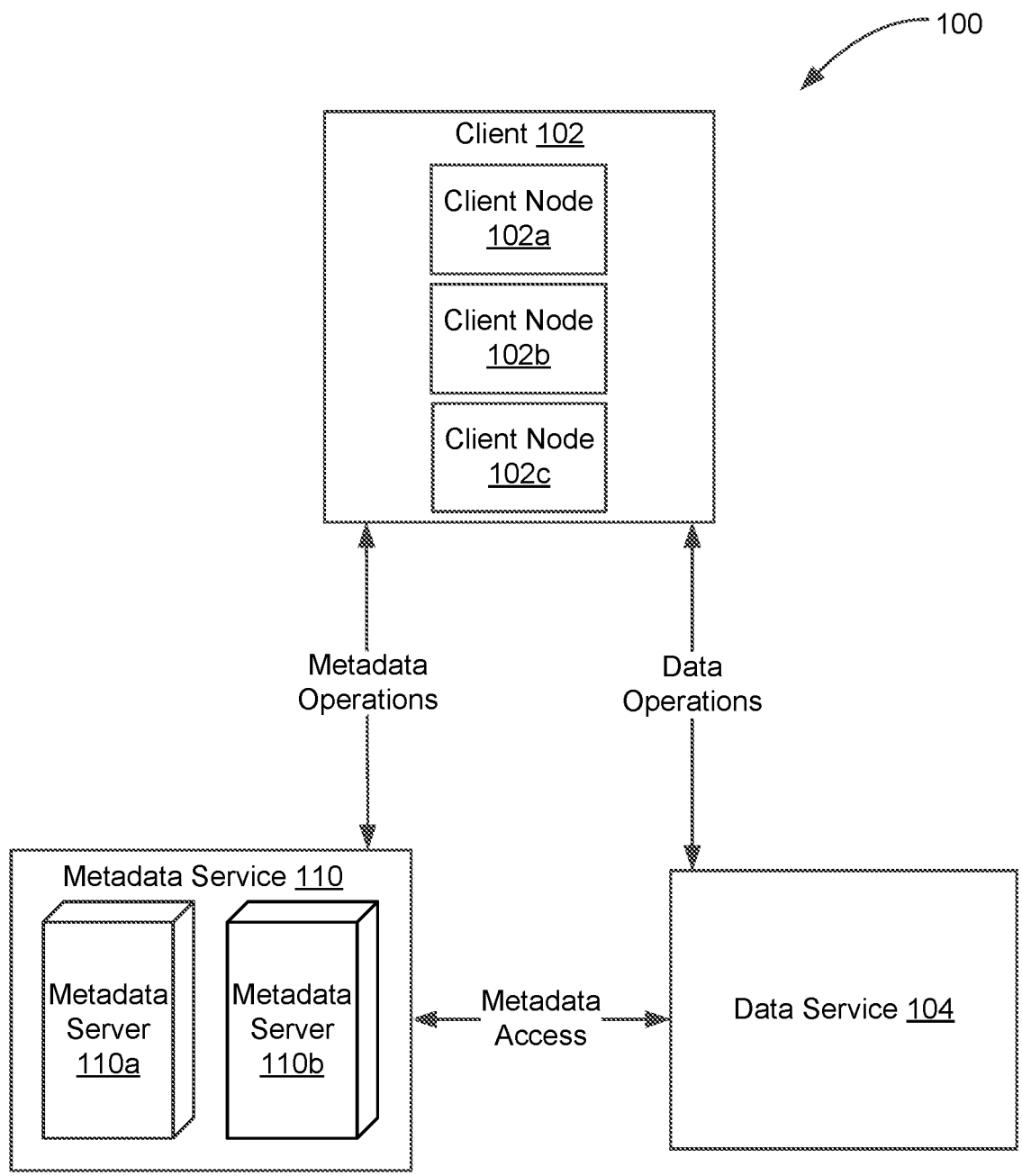
FIG. 1 illustrates a schematic diagram of a distributed storage system in which embodiments disclosed herein may be incorporated.

Embodiments of the disclosure relate to incorporating data sketches or data summary structures into metadata management to enable quick metadata queries on a set of metadata while maintaining relatively small memory and processing overhead. FIG. 1 illustrates a simplified diagram of an exemplary distributed storage system 100 in which disclosed embodiments may be incorporated. The distributed storage system 100 shown in FIG. 1 is for illustrative purposes only. Embodiments of the present disclosure are not limited to any particular architecture including the distributed storage system 100 shown in FIG. 1. Rather, embodiments are illustratively practiced within any number of different types of storage system including distributed storage systems that are file-type systems and object-based systems.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Distributed storage system 100 includes a client 102 having client nodes 102a, 102b and 102c. Although three client nodes are illustrated in FIG. 1, there may be any number of client nodes in distributed storage system 100 including a single client node. Distributed storage system 100 separates out data service 104 and metadata service 110 to deliver parallel data access and improve both data access and metadata throughput. Distributed storage system 100 includes data service 104 that provides data storage technologies for storing data and metadata. Metadata service 110 includes metadata servers or metadata service nodes 110a and 110b configured to access metadata in data service 104. While two metadata servers are illustrated in FIG. 1, there may be any number of metadata servers in distributed storage system 100 including a single metadata server. In addition, while metadata is stored in data service 104 in distributed storage system 100 of FIG. 1, it is possible that metadata may be stored separately from data service 104. Client nodes 102a, 102b and 102c provide an access interface to bridge client applications and data in data service 104 using data operations to access data. Client nodes 102a, 102b and 102c also provide an access interface to metadata servers 110a and 110b to access metadata in data service 104 using metadata operations.

Figure 2:
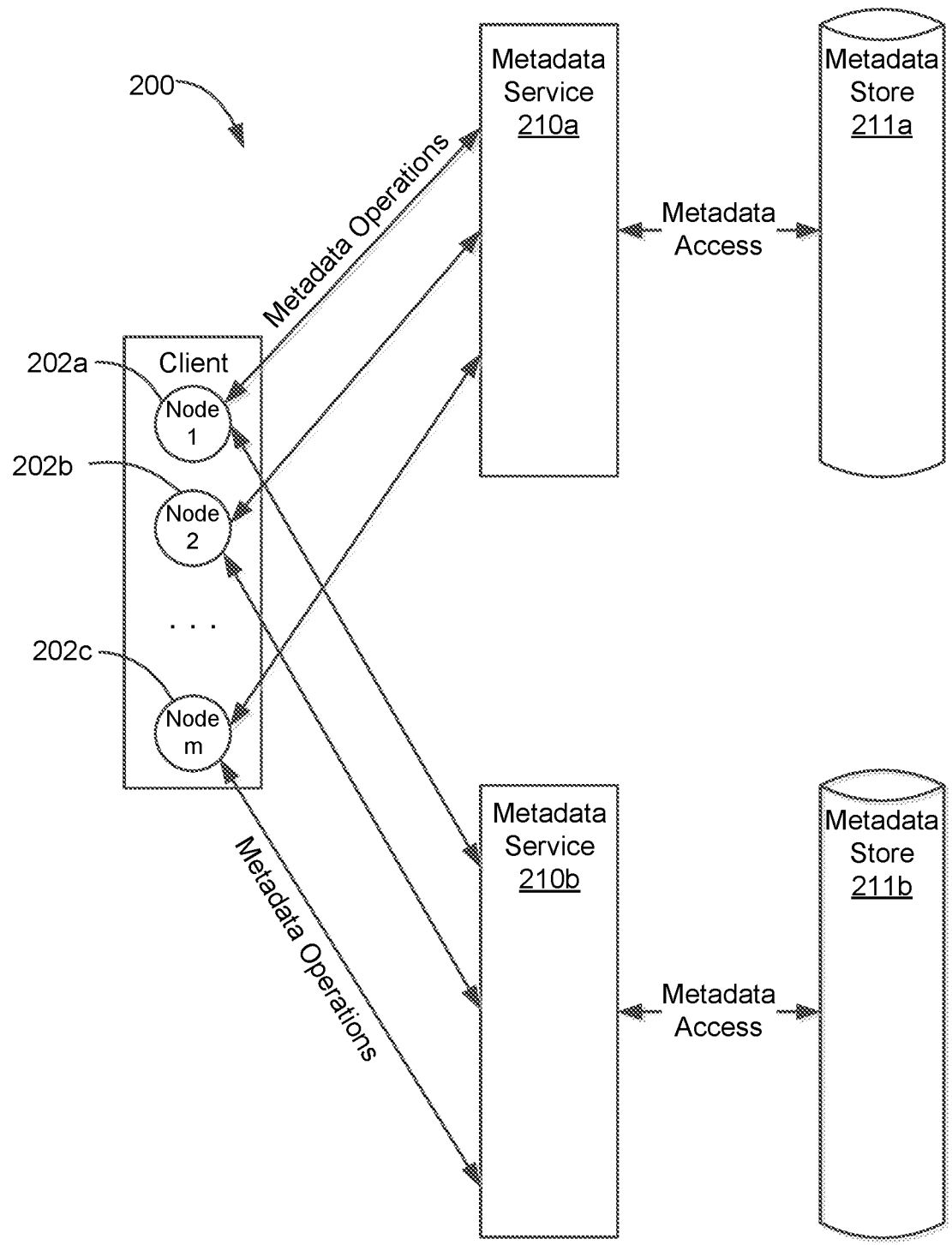
FIG. 2 illustrates a simplified schematic diagram of distributed metadata services in a distributed storage system according to an embodiment.

FIG. 2 illustrates a simplified schematic diagram of distributed metadata services in a distributed storage system 200 according to an embodiment. Client nodes 1 (202a), 2 (202b) and m (202c) provide access interfaces to metadata servers or metadata service nodes 210a and 210b and corresponding metadata stores 211a and 211b. Metadata stores 211a and 211b may or may not be located in a data service, such as data service 104 in FIG. 1. Metadata operations include requests to metadata service nodes 210a and 210b to create or delete and to update and retrieve metadata in corresponding metadata stores 211a and 211b. A metadata operation (0) usually has the form of O(key, value), where key represents the identification of an item or metadata object and value represents the value of metadata to set or the returned value. Metadata service nodes often serve this kind of operation or query and return a value.

It is difficult for an application to ask questions and make metadata queries involved in a large number of metadata. For example, querying for the distribution of object size of all objects in an object-based distributed storage system is useful in understanding the characteristics of access workload pattern and in IO optimizations, such as selecting optimized data layout parameters for objects, but difficult to retrieve query results since metadata service nodes lack the ability to mine metadata and make use of the knowledge mined. Essentially, such a metadata query may involve scanning all metadata object sizes over every metadata server or service node and therefore be forbiddingly expensive in terms of central processing unit (CPU), memory and network overheads. In another example, metadata object access frequency is useful in indicating how active a metadata object is during a specified period. However, like the above example, metadata servers often fail to capture metadata object access frequencies because of the large number of metadata to be queried.

It should be noted that when metadata queries are conducted over a set of metadata or knowledge from metadata operation streams are mined, approximate answers or results are acceptable if the approximation error is controlled under certain error bounds. For example, when querying metadata related to the distribution of object size to decide which range of object size is dominant so an application may tune data layout parameters accordingly, or when querying metadata related to the distribution of object access frequencies to decide the frequency threshold for the top 10% of access frequencies, answers to queries under certain error bounds (e.g., 1%) are often as effective as an exact answer.

Data sketching, which is a class of streaming algorithms, such as hashing functions ($h_1(o)$, $h_2(o)$, $h_3(o)$), may be applied to mine the rich metadata in, for example, an object-based distributed metadata store. These algorithms may handle high throughput of metadata operations streams in a single pass and compute metadata summaries or metadata sketches of metadata access. In one embodiment, metadata sketches or metadata summary structures are maintained by metadata servers or metadata service nodes. From these metadata sketches or metadata summary structures, it is possible to derive accurate approximate answers to metadata queries. Data sketches or data summary structures are different from traditional sampling techniques in that data sketches or data summary structures examine all the elements of a data stream, touching each element only once, and often have a certain form of randomization that forms the basis of their stochastic nature. In object-based distributed storage systems, a sequence of object metadata accesses from a metadata store are modeled as a data stream S, where each object metadata access is an element of the data stream S. Queries on metadata sketches or metadata summary structures are executed by a set of estimator algorithms and the returned result is approximate but well established and has mathematically proven error distribution bounds. Data sketches or data summary structures are typically fast, highly parallelizable, approximate and small in terms of memory usage.

Figure 3:
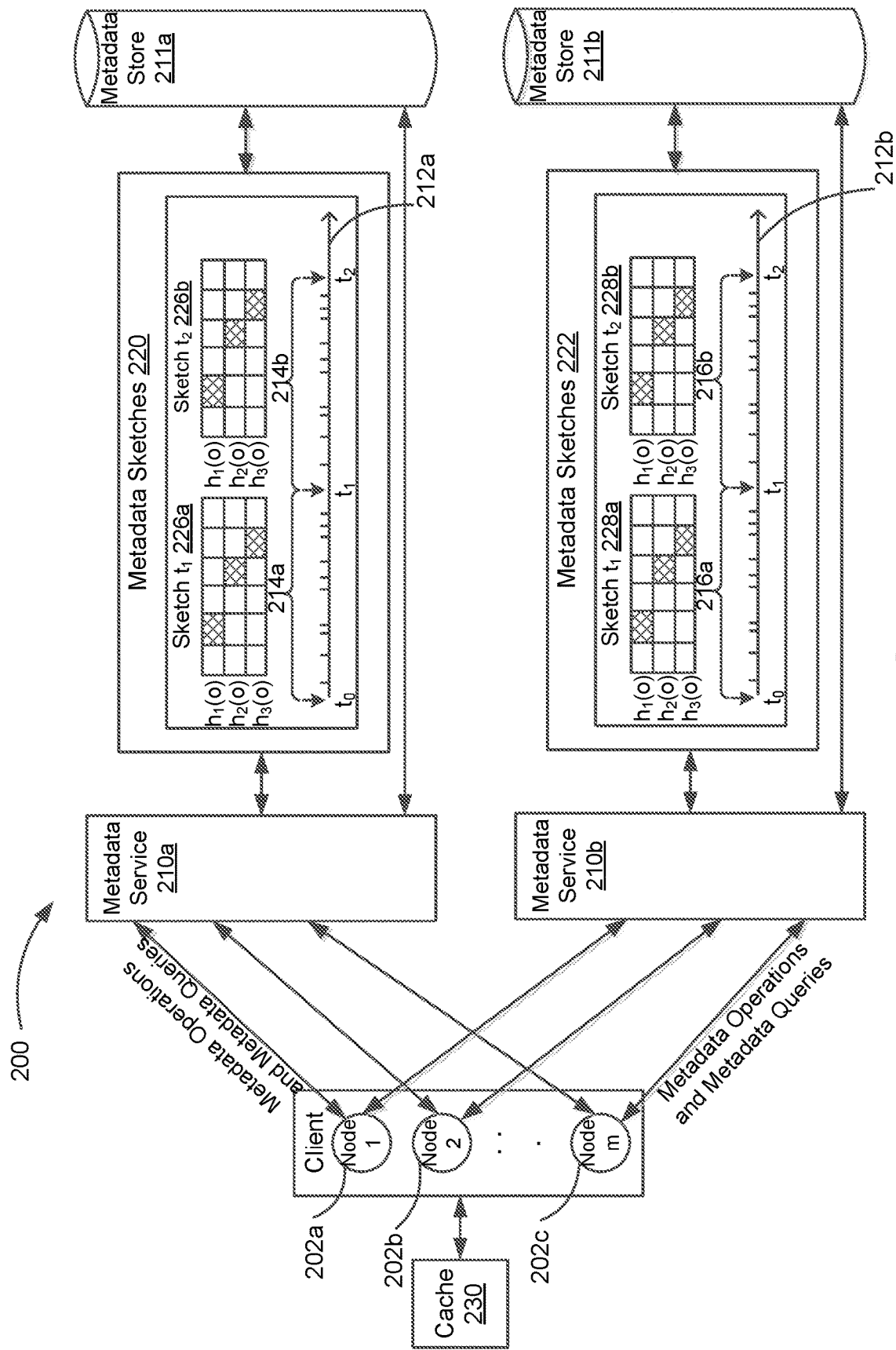
FIG. 3 illustrates a schematic diagram of parallel creation of metadata summary structures or metadata sketches in the distributed storage system of FIG. 2 according to an embodiment.

FIG. 3 illustrates a schematic diagram of parallel creation of metadata summary structures or metadata sketches 220 and 222 maintained by metadata service nodes 210a and 210b in distributed storage system 200 according to an embodiment. In the FIG. 3 embodiment, metadata summary structures or metadata sketches 220 and 222 are exemplary Count-Min sketches or structures where each sketch or structure 220 and 222 includes a two-dimensional array of columns and rows, and associated with each row, is a hash function ($h_1(o)$, $h_2(o)$, $h_3(o)$), where the hash functions use an object metadata identifier or key of operation (o) as input.

While many different types of data sketches or data summary structures and algorithms may be integrated into embodiments to create metadata sketches or metadata summary structures to be maintained by metadata servers, such as a Count-Min sketch. The Count-Min sketch, as an example, consumes a stream of object metadata access operations and updates the access frequency of different object metadata in the stream for each operation. The Count-Min sketch uses a two-dimensional array of d columns and w rows. The parameters d and w are fixed when the sketch is created. Associated with each of the w rows is a separate hash function. The hash functions are pairwise independent. A family of hash functions are said to be k-independent, k-wise independent or k-universal if selecting a function at random from the family guarantees that the hash codes of any designated k keys are independent random variables. When a metadata object is accessed, the metadata sketch or metadata summary structure is updated as follows: for each row w of the two-dimensional array, the corresponding hash function is applied to obtain a column index $d=h_i(o)$, where o is the object metadata identifier or key. Then the value in element (w, d) is incremented by one. At anytime the metadata sketches or summary structures may be queried and the algorithm returns an estimate that is within a certain distance of the actual value, with a certain probability. Under one embodiment, each metadata service node 210a and 210b manages, updates and maintains its sets of metadata sketches or metadata summary structures 220 and 222 in parallel.

As discussed above and in one embodiment, metadata sketches for each metadata service node 210a and 210b are updated or created when an object metadata access request arrives. Therefore, each metadata service node 210a and 210b updates or creates its own metadata sketches in parallel, which reduces the memory consumption and processing overhead in each service node. Over time, metadata object access workloads and patterns change. This is the result of metadata object or metadata item age and lifetime or change of jobs. Queries on the metadata sketches or metadata summary structures are accordingly restricted to recent metadata. Under another embodiment, merging of metadata sketches or metadata summary structures, or in other words, using a sliding window mechanism to solve the problem of object aging may be applied. The object metadata access streams, such as metadata access streams 212a and 212b, are broken into small windows 214a and 214b and 216a and 216b. Each window covers a period of time, for example, a few hours and each window is sketched into a data sketch or data summary structure 226a, 226b, 228a, and 228b separately. Different metadata sketches or structures from different windows at metadata server 210a and 210b are merged together, and queries are conducted over the merged metadata sketches or structures.

Figure 4:
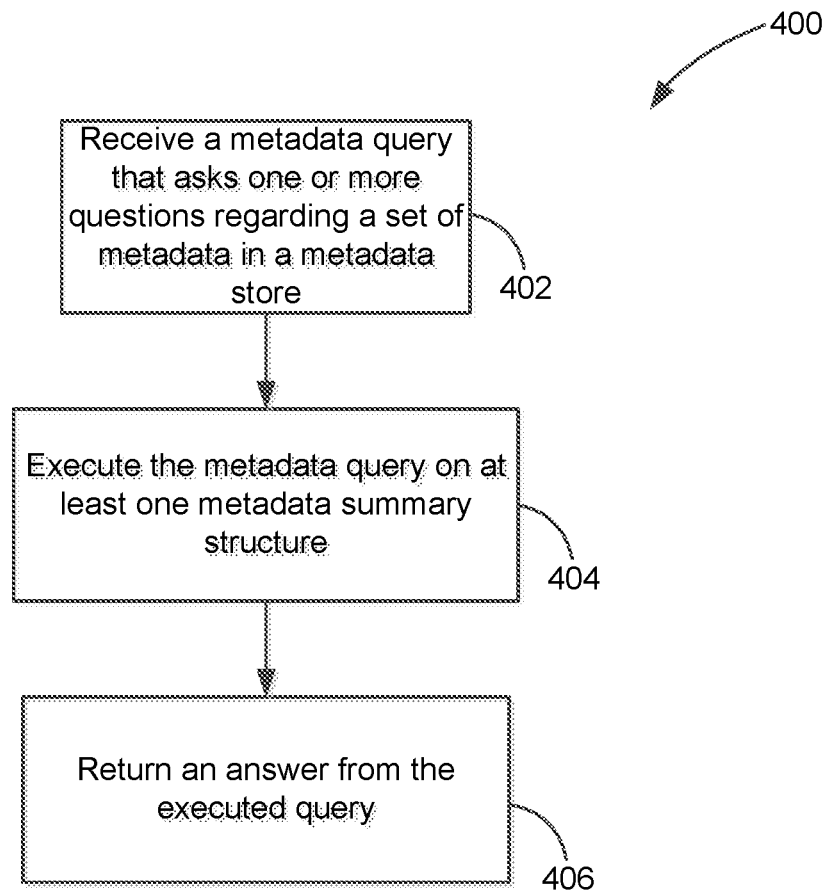
FIG. 4 illustrates a block diagram of a method of querying metadata in a storage system according to an embodiment.

FIG. 4 illustrates a block diagram of a method 400 of querying metadata in a storage system, such as distributed storage system 100 in FIG. 1 and distributed storage system 200 in FIGS. 2 and 3. At block 402, a metadata query is received that asks one or more questions regarding a set of metadata in a metadata store. In particular and as illustrated in FIG. 3, any query from a client node (202a, 202b, 202c) is sent over and served in parallel at all metadata server nodes 210a, 210b. At block 404, the query is executed on at least one metadata sketch or summary structure (220, 222) maintained by a metadata server node 210a, 210b. As previously discussed, the at least one metadata sketch or summary structure (220, 222) is a summary of metadata access streams over a period of time and the at least one metadata sketch or summary structure (220, 222) may be more than one metadata sketch or summary structure merged with other metadata sketches or summary structures from different periods of time. At block 406, the latest metadata sketch or summary structure is returned. The metadata sketch or summary structure (220, 222) usually consumes small amounts of memory, for example, a count-min sketch with 1024 columns and 8 rows uses only 32 KB of memory when each element is 4 bytes (32 bits). Since the query is served in parallel at all metadata server nodes 210a, 210b, more than one answer, in the form of more than one metadata sketches, may be returned. All returned metadata sketches may be merged at the client node 202a, 202b or 202c where the query originated. The query may then be conducted locally on the client node merged metadata sketch to obtain the answer.

In general, the frequency of metadata queries is less than the frequency of normal metadata operations. Therefore, as described above, a query request may be served to all metadata service nodes 210a and 210b. In another embodiment, and as also described above, recently merged metadata sketches or metadata summary structures at client nodes 202a, 202b and 202c may be cached or stored at client nodes 202a, 202b and 202c into a cache 230. Metadata query requests may then be served locally at client nodes 202a, 202b and 202c. The cached metadata sketches or metadata summary structures may be updated at a pre-defined interval.

The following are exemplary implementations of metadata queries on metadata sketches or summary structures. In one embodiment, a metadata query on metadata sketches or summary structures may be used to improve the IO of data operations. Understanding file size distribution is useful in designing and evaluating file systems. In particular, large high-performance computing system (HPC) installations include many millions of files having distributions of up to terabytes (TB) in size. While there are a large number of relatively small sized files, most of the capacity is occupied by relatively large sized files. Given file size distribution, a ratio of different storage technologies may be used in these installations. In object-based distributed storage systems, parity data layout may be stripped and declustered and spread as objects across multiple data service nodes and storage devices to achieve better performance. Choosing a suitable data unit size is key to stripping and declustering parity data layout and can be chosen to cover object sizes by querying metadata for object size distribution. Unlike current systems, embodiments described herein allow client nodes to query size distribution when the storage system is running, which enables applications to dynamically be optimized.

In another embodiment, a metadata query on metadata sketches or summary structures may be used to monitor object stores. Storage system management utilizes monitoring for the successful operation of large scale storage systems. Timely detection of failure events and monitoring of status and performance metrics allow system administrators to track the health of the system and to provide stable computing services for users. In distributed storage architectures, a storage system may store data in 10s or 100s of high density storage or service nodes with each hosting 10s or 100s of storage devices, not to mention a greater number of client nodes to serve theses service nodes. The need to monitor, in near real-time, data streams coming from multiple sources posts a substantial challenge on the system. The amount of monitoring data generated can be high enough that simply forwarding all this information to a central database and processor can strain the capacities (e.g., network, CPU) of the monitored resources. A monitoring system usually calculates and displays simple summary statistics such as overall means and variances.

For example, monitoring systems keep averages or medians of IO (metadata or data) latencies to be able to aggregate those values and derive metrics. Unfortunately, a simple average or median of IO latency, although easy to monitor, is not useful when data is skewed by outlying values. Quantiles, such as $50^{th}$ and $99^{th}$ percentiles, may be more useful to reveal more information about IO performance, however, exact quantiles are costly to compute as they store and scan all data. Unlike CPU usage where memory consumption and network utility monitoring, where data items in a stream are not deleted, distributed storage systems support deletion operations, which further complicates the calculation of statistics of data. By integrating metadata sketching algorithms, it is feasible to build a storage monitoring system which generates statistical summaries (including quantiles mentioned in this paragraph) on IO operation metrics using a small amount of memory and cost.

In yet another embodiment, a metadata query on metadata sketches or summary structures may be used to trace online workload collection. Efficient use of storage system resources includes the extensive application of IO tuning or, in other words, the ability to observe and understand IO behaviors. Tools have been developed to collect IO operation data in varied environments including personal computers and large scale HPC clusters. In fact, analytical approximations for distributions of file size, file age, file functional lifetime, directory size and directory depth have been developed. Performance variation can occur over periods of days because of systematic, long-term conditions of storage systems. Overall performance (and therefore productivity) may be improved for a wide range of users if deviations can be identified and attributed quickly in production.

Unlike existing IO workload collection techniques, which rely on instrumentation, the built-in or created metadata sketches or summary structures may be used as sources of IO workload data. Queries over metadata sketches or summary structure of object size, lifetime and other metadata gives answer to statistics of these metadata, not only including summary statistics such as averages or medians, but also statistics like quantiles in small memory and CPU overhead. Metadata sketches or summary structures may be integrated into a continuous online workload collection framework enabling long term workload collection.

The illustrations of the embodiments described herein are intended to provide a general understanding of the structure and methods of the various embodiments. The illustrations are not intended to serve as a complete description of all of the elements and features of apparatus, methods and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the extent allowed by law, the scope of the present disclosure is to be determined by the broadest permissible interpretation of the following claims and their equivalents, and shall not be restricted or limited by the foregoing detailed description.

What is claimed is:

1. A method of efficiently querying metadata in a storage system, the method comprising:
   receiving a metadata query from a client node that asks one or more questions regarding a set of metadata in a metadata store;
   executing the metadata query on at least one metadata sketch, wherein the at least one metadata sketch summarizes a metadata stream of metadata access during a period of time and thereby has a smaller memory footprint than the metadata stream during the period of time, and wherein different metadata sketches from different periods of time are periodically merged together so that the metadata query is conducted on a merged metadata sketch;
   returning an answer from the metadata query executed on the merged metadata sketch, wherein the answer is an approximate response, which is within a predetermined bounded distance from an actual answer, to the one or more questions regarding the set of metadata in the metadata store, and wherein the predetermined bounded distance encompasses a portion of the merged metadata sketch that comprises a data size that is less than a data size of the merged metadata sketch; and
   performing analysis of the storage system or data stored in the storage system with the approximate response.

2. The method of claim 1, wherein the storage system comprises an object-based distributed storage system and the metadata stream of metadata access comprises a stream of object metadata access of metadata objects.

3. The method of claim 1, wherein the at least one metadata sketch is maintained by one of a plurality of metadata servers.

4. The method of claim 3, wherein when metadata is accessed by one of the plurality of metadata servers, the metadata server creates a new metadata sketch.

5. The method of claim 3, wherein executing the metadata query comprises executing the metadata query in parallel at all of the plurality of metadata servers and on a plurality of metadata sketches that are each maintained by one of the plurality of meta data servers.

6. The method of claim 5, wherein returning the answer comprises returning a plurality of answers from the plurality of metadata servers.

7. The method of claim 6, wherein the plurality of returned answers are configured to be merged at the client node.

8. The method of claim 1, wherein the merged metadata sketch is stored in a cache at the client node so that the metadata query is served locally at the client node, and wherein the merged metadata sketch is updated periodically.

9. The method of claim 1, wherein the at least one metadata sketch comprises a Count-Min structure having a two dimensional array of rows and columns, and wherein each row includes a hash function.

10. A method of efficiently querying metadata in a storage system, the method comprising:
  each of a plurality of metadata servers receiving in parallel a query from a client node that asks one or more questions regarding sets of metadata in corresponding metadata stores;
  each of the plurality of metadata servers executing in parallel the metadata query on at least one metadata sketch, wherein each metadata sketch summarizes a metadata stream of metadata access by one of the plurality of metadata servers during a period of time and thereby has a smaller memory footprint than the metadata stream during the period of time, and wherein different metadata sketches from different periods of time are periodically merged together so that the metadata query is conducted on a merged metadata sketch at each of the plurality of metadata servers; and
  returning a plurality of answers from the plurality of metadata servers that each executed the query on the merged metadata sketches at each of the plurality of metadata servers, wherein each of the plurality of answers is an approximate response, which is within a predetermined bounded distance from an actual answer, to the one or more questions regarding the set of metadata in the corresponding metadata store, and wherein the predetermined bounded distance encompasses a portion of the merged metadata sketches that comprises a data size that is less than a data size of the merged metadata sketches; and
  performing analysis of the storage system or data stored in the storage system with the plurality of approximate responses.

11. The method of claim 10, wherein the storage system comprises an object-based distributed storage system and the metadata stream of metadata access comprises a stream of object metadata access of metadata objects.

12. The method of claim 10, wherein each merged metadata sketch is maintained by one of a plurality of metadata servers.

13. The method of claim 12, wherein when metadata is accessed by each of the plurality of metadata servers, each metadata server creates a new metadata sketch.

14. The method of claim 10, wherein the plurality of returned answers comprise a plurality of metadata sketches and the plurality of metadata sketches are configured to be merged at the client node.

15. A storage system in which efficient querying of metadata is carried out, the storage system comprising:
  at least one processor;
  at least one client node;
  at least one metadata store;
  at least one metadata server corresponding with the at least one metadata store and configured to receive metadata operations and metadata queries from the at least one client node; and
  at least one metadata sketch that summarizes a metadata stream of metadata access during a period of time and thereby has a smaller memory footprint than the metadata stream during the period of time, wherein different metadata sketches from different periods of time are periodically merged together so that a metadata query is executed on a merged metadata sketch; and
  wherein the at least one client node is configured to receive an answer from the metadata query executed on the merged metadata sketch, wherein the answer is an approximate response, which is within a predetermined bounded distance from an actual answer, to the metadata query, and wherein the predetermined bounded distance encompasses a portion of the merged metadata sketch that comprises a data size that is less than a data size of the merged metadata sketch.

16. The storage system of claim 15, wherein the storage system comprises an object-based distributed storage system and the metadata stream of metadata access comprises a stream of object metadata access of metadata objects.

17. The storage system of claim 15, wherein the at least one metadata server comprises a plurality of metadata servers, each metadata server corresponding with one of a plurality of metadata stores and each metadata server maintaining the merged metadata sketch that summarizes the metadata access between each metadata server and each corresponding metadata store.

18. The storage system of claim 17, wherein the at least one client node serves in parallel the metadata query to all of the plurality of metadata servers and on merged metadata sketches maintained by the plurality of metadata servers.

19. The storage system of claim 18, wherein the client node is configured to receive a plurality of answers in response to the metadata query, the plurality of answers comprise a plurality of metadata sketches that are configured to be merged at the client node.

20. The distributed storage system of claim 15, wherein each metadata sketches comprises a Count-Min structure having a two dimensional array of rows and columns, wherein each row includes a hash function.

* * * * *